United States Patent [19]

Takahashi et al.

[11] Patent Number: 6,091,885
[45] Date of Patent: Jul. 18, 2000

[54] SIGNAL RECORDING SYSTEM USING MEMORY FOR AUDIO SIGNAL

[75] Inventors: Koji Takahashi; Teruo Hieda; Kenji Kyuma; Yoshihiro Nakatani; Koichiro Suzuki; Takeshi Abe; Yoshifumi Ishikawa, all of Kanagawa-ken, Japan

[73] Assignee: Canon Kabushiki Kaisha, Tokyo, Japan

[21] Appl. No.: 07/636,771

[22] Filed: Jan. 2, 1991

[30] Foreign Application Priority Data

| Jan. 6, 1990 | [JP] | Japan | ................................... 2-000894 |
| Jan. 9, 1990 | [JP] | Japan | ................................... 2-002969 |
| Jan. 10, 1990 | [JP] | Japan | ................................... 2-004271 |

[51] Int. Cl.$^7$ .................................................. H04N 5/91
[52] U.S. Cl. ............................... 386/96; 386/107; 369/48
[58] Field of Search .............................. 360/19.1, 22, 24, 360/10.1; 358/343, 906, 909, 341, 909.1; 369/48, 47; 386/96, 104, 107, 54, 39

[56] References Cited

U.S. PATENT DOCUMENTS

| 4,680,647 | 7/1987 | Moriyama ........................... 360/19.1 X |
| 4,764,817 | 8/1988 | Blazek et al. ....................... 360/19.1 X |
| 4,779,138 | 10/1988 | Nomura et al. ............................ 348/790 |
| 4,961,116 | 10/1990 | Kanamaru et al. ................. 360/19.1 X |
| 5,130,812 | 7/1992 | Yamaoka ............................. 360/19.1 X |

FOREIGN PATENT DOCUMENTS 0085517 8/1983 European Pat. Off. .................. 360/47

*Primary Examiner*—Andrew L. Sniezek
*Attorney, Agent, or Firm*—Robin, Blecker & Daley

[57] ABSTRACT

A system comprising a recording apparatus including an audio input portion and a recording portion capable of recording an audio signal from the audio input portion on a recording medium, and an audio memory unit detachably attached to the recording apparatus, wherein the memory unit includes a memory capable of storing the audio signal from the audio input portion, and the recording apparatus is arranged to record also the audio signal read out from the memory on the recording medium by the recording portion, thereby making it possible to record a wide variety of audio signals of different kinds on the recording medium in desired timing. Also, this memory unit is utilized to make it possible that in application to the apparatus for recording video signals and audio signals in superimposed relation, the video signal is rewritten only in itself.

17 Claims, 8 Drawing Sheets

SIGNAL RECORDING SYSTEM USING MEMORY FOR AUDIO SIGNAL

BACKGROUND OF THE INVENTION

1. Field of the Invention

This invention relates to signal recording systems and, more particularly, to a signal recording system using a memory for audio signals.

2. Description of the Related Art

The video signal recording system of this kind has been known and is employed in the so-called camera-integrated type video tape recorder (VTR). So, taking an example of this type VTR, it is explained below.

In the camera-integrated VTR, after the shooting has been done with video images and the sound recorded, a BGM (Background Music) or like sound may be additionally recorded. Of the methods of this purpose, the so-called "after-recording" is well known.

Meanwhile, it is recently proposed to utilize the deep-layer recording method. This recording method is called the "VOS (Video On Sound)".

Since the above after-recording method needs no more explanation, this VOS will be briefly described below.

The VOS is for the photographer, while listening to a music previously recorded in a deep layer of the magnetic recording medium, to take pictures in time to this music. The video signal is recorded in a surface layer of the recording medium.

At first, as shown in FIG. 1, an audio signal is previously recorded in a deep layer a1 of a recording medium a3. In the form of a counterpart to this, another audio signal of the same content is recorded in a linear track a2 in the vicinity of one of the edges of the tape-shaped recording medium a3. And, when shooting, the audio signal recorded in the linear track a2 is reproduced by a fixed head a4, a reproducing circuit a8 and an amplifier a9. Listening to the sound issuing from an output terminal a10 in order to confirm the content of the other audio signal recorded in the deep layer a1, the photographer adjusts the timing of actuation of a camera portion to the sound being output from the terminal a10, so that the camera portion composed of an image sensor a11 and a camera signal processing circuit a12 is operated to take pictures. A switch a13 alternates application of a video signal from the camera portion to recording amplifiers a14 and a15. Rotary heads a6-A an a6-B then record the outputs of these amplifiers a14 and a15, while forming video tracks a7 over the deep-layer tracks a1.

Thus, while hearing the previously recorded BGM, the photographer takes pictures. By this, he is enabled to complete taking pictures in time to the BGM or the like.

However, the above-described after-recording method is to perform the recording of the BGM or the like after the end of shooting. So, for the same tape, the recording has to be done twice. Moreover, besides the camera-integrated type VTR, another apparatus which reproduces the sound has to be employed, and its operation has to be performed in synchronism with the VTR. Therefore, the management is very troublesome.

The above-described VOS method, too, requires likewise twice performance of recording on one and the same tape. Further, the shooting period of time is disadvantageously limited by the length of time of the previously recorded audio signal.

Still another problem is that it is usually impossible to replace the video signal by another one under the condition that the audio signal is left as it is.

SUMMARY OF THE INVENTION

An object of the invention is to eliminate the above-described problems.

Another object of the invention is to provide a signal recording system which is able to record a variety of sounds in desired timing without having to prepare a special apparatus.

Under such objects, according to the invention, in a preferred embodiment thereof, a signal recording system is proposed, comprising a recording apparatus including an audio input portion and recording means capable of recording an audio signal from the audio input portion on a recording medium, and a memory unit detachably attached to the recording apparatus, the memory unit including a memory capable of storing the audio signal from the audio input portion, wherein the recording apparatus is arranged to be capable of recording also the audio signal read out from the memory on the recording medium by the recording means.

Still another object of the invention is to provide a signal recording system which makes it possible to rewrite the video signal alone, leaving the audio signal as it is.

Under such an object, according to the invention, in another embodiment thereof, a signal recording system is proposed, comprising an audio input portion for receiving an audio signal, a video input portion for receiving a video signal, a memory capable of storing the audio signal from the audio input portion, recording means for recording the audio signal from the audio input portion or the audio signal read out from the memory and the video signal from the video input portion on a common recording medium, and mode selection means for changing the system over between a first mode wherein the audio signal from the audio input portion and the video signal from the video input portion are recorded by the recording means while the audio signal from the audio input portion is stored in the memory, and a second mode wherein the audio signal read out from the memory and the video signal from the video input portion are recorded by the recording means.

A further object of the invention is to provide a signal recording system which, though using a memory of small capacity, is able to store a wide variety of sounds and to record them for desired lengths in desired timing.

Under such an object, according to the invention, in another embodiment thereof, a signal recording system is proposed, comprising an audio input portion for receiving an audio signal, compressing means for compressing an amount of information of the audio signal from the audio input portion, first memory means capable of storing the audio signal compressed by the compressing means, expanding means for expanding an amount of information of the compressed audio signal read out from the first memory means, recording means capable of recording the audio signal from the audio input portion and the audio signal expanded by the expanding means on a recording medium, and second memory means, responsive to a stop of a recording operation of the recording means, for taking in only predetermined samples of the audio signal expanded by the expanding means, and responsive to start of the recording operation of the recording means, for supplying the predetermined samples of the audio signal to the expanding means.

Other objects than those described above of the invention and its features will be apparent from the following detailed description of embodiments of the invention by reference to the drawings.

DETAILED DESCRIPTION OF THE PREFERRED EMBODIMENTS

The invention is next described in connection with embodiments thereof.

Figure 1:
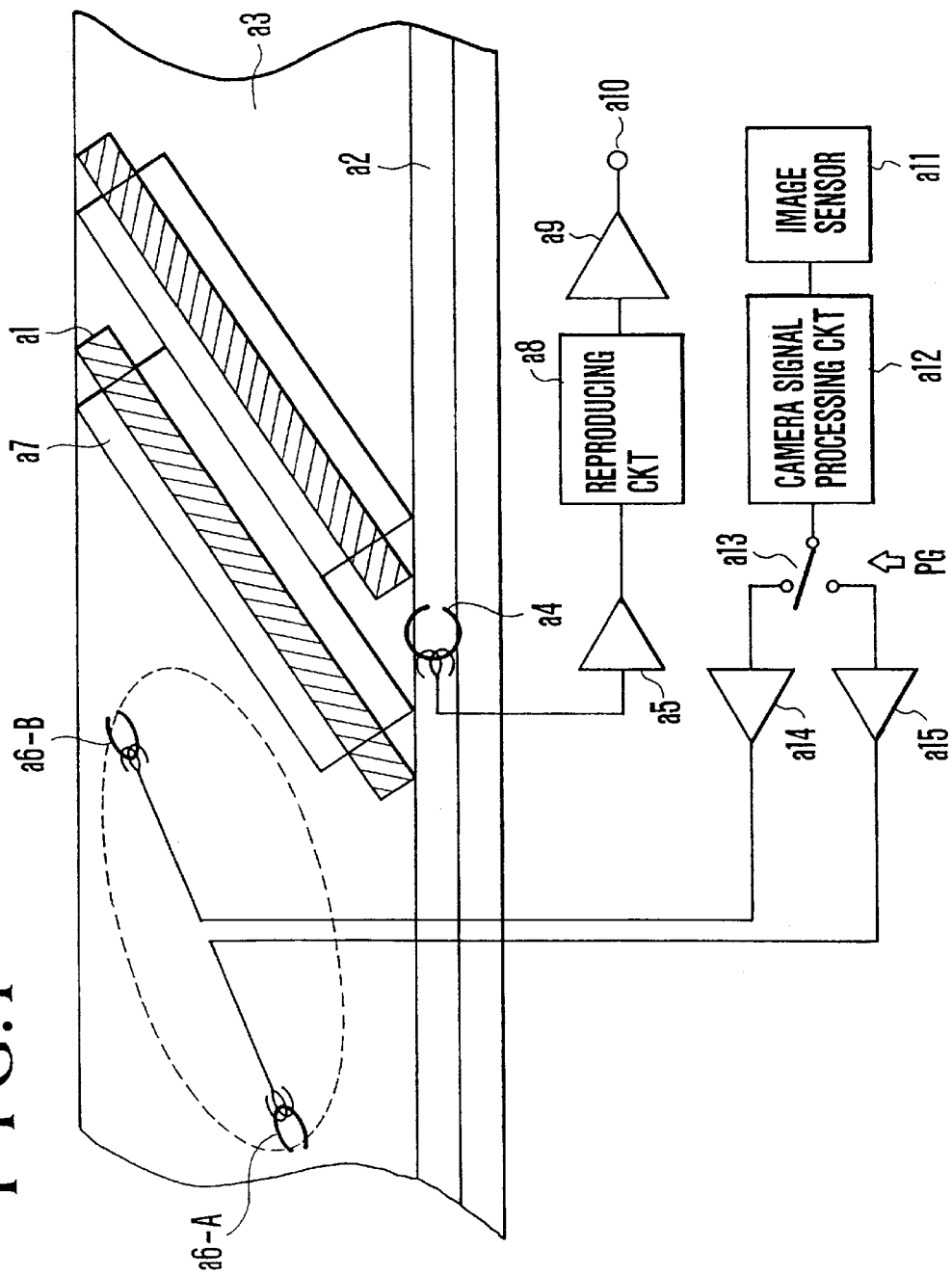
FIG. 1 is a diagram for explaining an example of the conventional additional recording of audio signals.
Figure 2:
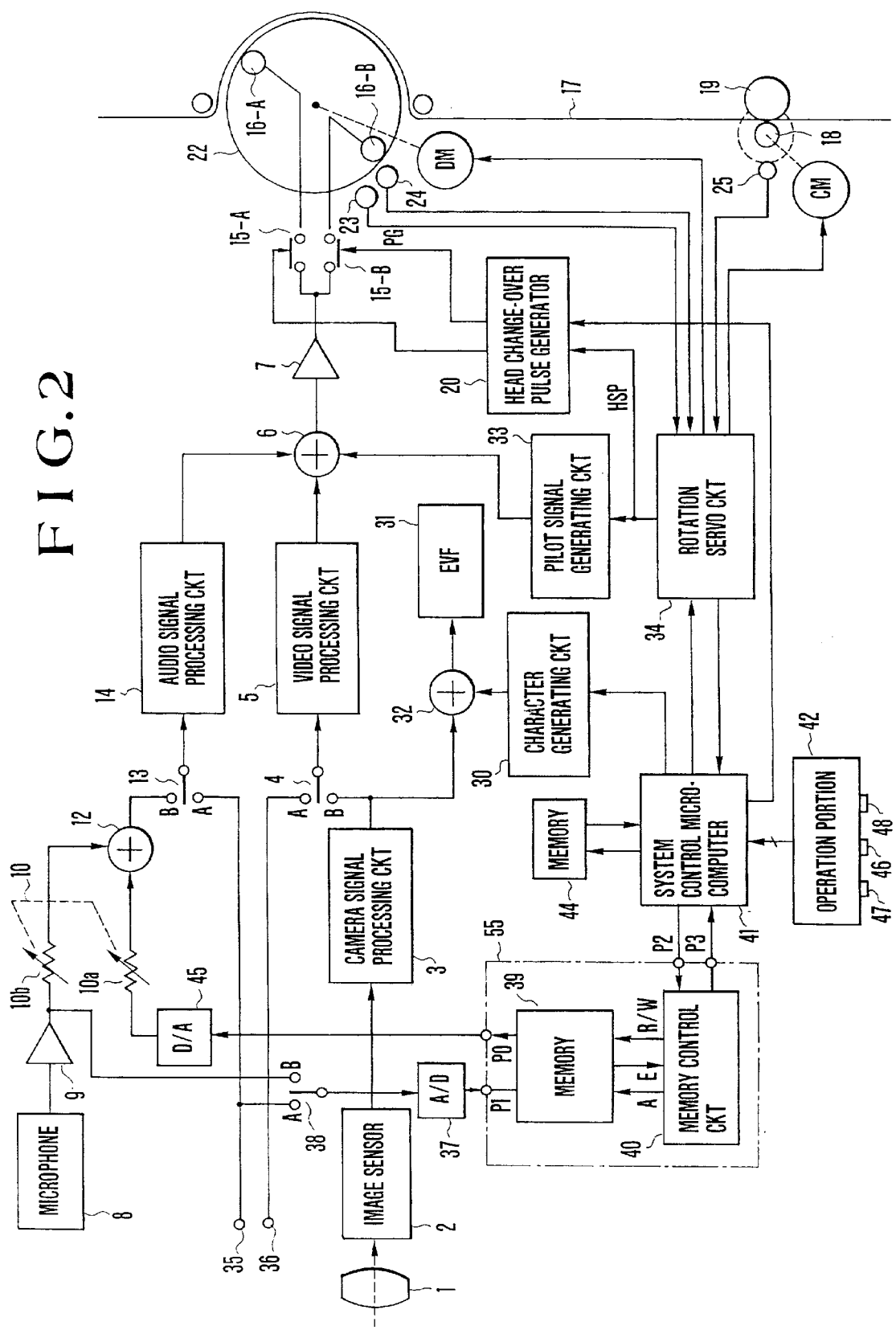
FIG. 2 is a schematic diagram, partly in block form, of the recording system of an embodiment of a camera-integrated type VTR according to the invention.

FIG. 2 shows a first embodiment of the invention with the construction and arrangement of the elements of the recording system of the camera-integrated type VTR. This VTR has a camera portion comprised of a taking lens 1, an image sensor 2 and a camera signal processing circuit 3, a video signal processing circuit 5 receptive of the video signal from the camera portion for producing an output to be recorded, and an audio signal portion comprised of a microphone 8 for collecting sound, a microphone amplifier 9 and an audio signal processing circuit 14. To record the audio signal and the video signal, there is provided a magnetic recording portion comprised of an adder 6, a recording amplifier 7 and head change-over switches 15-A and 15-B by which rotary heads 16-A and 16-B on a drum 22 alternate in recording the aforesaid video signal and audio signal on a tape-shaped recording medium 17.

Further, this VTR has the following servo mechanism required for recording. Firstly, a capstan servo system is comprised of a pinch roller 19, a capstan 18 pressing the tape 17 against the pinch roller 19, an FG sensor 25 for detecting revolutions of the capstan 18, a rotation servo circuit 34 for controlling the rotational frequency of a capstan motor CM in accordance with the FG signal output from the sensor 25, and the capstan motor CM which is driven by the control signal from the servo circuit 34.

A drum servo system for controlling rotation of the rotary drum 22 in synchronism with the vertical synchronizing signal of the video signal is comprised of a PG generator 23 for detecting the phase of rotation of the rotary drum 22, an FG generator 24 for detecting the speed of rotation of the rotary drum 22, the rotation servo circuit 34 for controlling the speed and phase of rotation of the drum 22 on the basis of the output signals of the generators 23 and 24, and a drum motor DM which is driven by a control signal from the rotation servo circuit 34.

The rotation servo circuit 34 produces head switching pulses (HSP) having a constant phase relationship to the drum PG output from the PG generator 32. Responsive to this HSP, the head change-over switches 15-A and 15-B alternate in closing by periods of the video vertical synchronizing signal.

By such an arrangement of the servo systems, the relative position of the tape 17 to the heads 16-A and 16-B is determined when the video signal and the audio signal are recorded in the normal mode.

Next, the operation of storing a specified BGM or like sound in the memory 39 is described.

The audio signal received at the external input terminal 35 and the audio signal for the sound collected by the microphone 8 are applied to the selection switch 38. The one. of the audio signals which passes through the switch 38 then enters the A/D converter 37, where it is sampled at a frequency of 15–48 KHz and converted into digital data in a quantization level of about 8–16 bits. Under this condition, when a memory key 47 of an operation portion 42 is depressed, a system control microcomputer 41 then commands a memory control circuit 40 to render the memory 39 operative in the write mode. The digital audio data having a predetermined period of time is written in the memory 39.

This memory 39 in the form of a memory unit 55 including the memory control circuit 40 is attachable to and detachable from a housing of the system. For this purpose, the housing is provided with a sound input port P0 and an output port P1 for audio signals connectable to the memory 39, and interconnection ports P2 and P3 through which information is given and received between the memory control circuit 40 and the system control microcomputer 41.

The VTR of the present invention has a mode in which the sound read from the memory 39 is recorded. The operation of this mode is described below.

The audio data read from the memory 39 is converted back into the original audio signal of analog form by the D/A converter 45. This restored analog audio signal is connected to a volume control 10a of a sound mixer (balancer) 10. This balancer 10 comprises the volume control 10a for setting a volume of the sound from the memory side, another volume control 10b for setting a volume of the sound from the microphone side, and an adder for mixing the output signals of these two volume controls, wherein these two volumes are assembled with each other so as to set the sound volumes complementarily. In other words, when the volume control assembly is turned fully to one terminal end, only one of the sounds is output, while the other sound is not output. At any intermediate position in between its terminal ends, the mixed audio signal of a volume balance corresponding to that position is output.

The BGM or like music stored, prior to shooting, in the memory 39 is reproduced by the above-described arrangement and operation occurs from the memory 39 during the shooting. With this, the audio signal output from the adder 12 is processed by the audio signal processing circuit 14 described before, and recorded on the tape 17 together with the video signal.

Incidentally, one of the external audio signal from the terminal 35 and the audio signals from the adder 12 is selected by a changeover switch 13. One of the external video signal from the terminal 36 and the output of the camera signals processing circuit 3 is selected by a changeover switch 4. The changeover switches 4 and 13 are normally connected to their B sides. When receiving the external inputs, they are moved to their A sides.

In the following, the memory control in the joined shooting operation of the camera-integrated VTR is described.

As has been mentioned beforehand, the memory 39 is controlled by the memory control circuit 40, which in turn is controlled by the system control microcomputer 41. The microcomputer 41 alters the control content to a right one according to the operation portion 42. The operation portion 42 is arranged to accept various operating keys described below. That is, the operation portion 42 includes a memory key 47 for causing music to be recorded prior to the camera shooting, a BGM key 46 for setting whether or not the BGM or like sound stored in the memory 39 is to be reproduced and a trigger key 48 for starting or stopping a recording operation of the camera-integrated type VTR.

Figure 3:
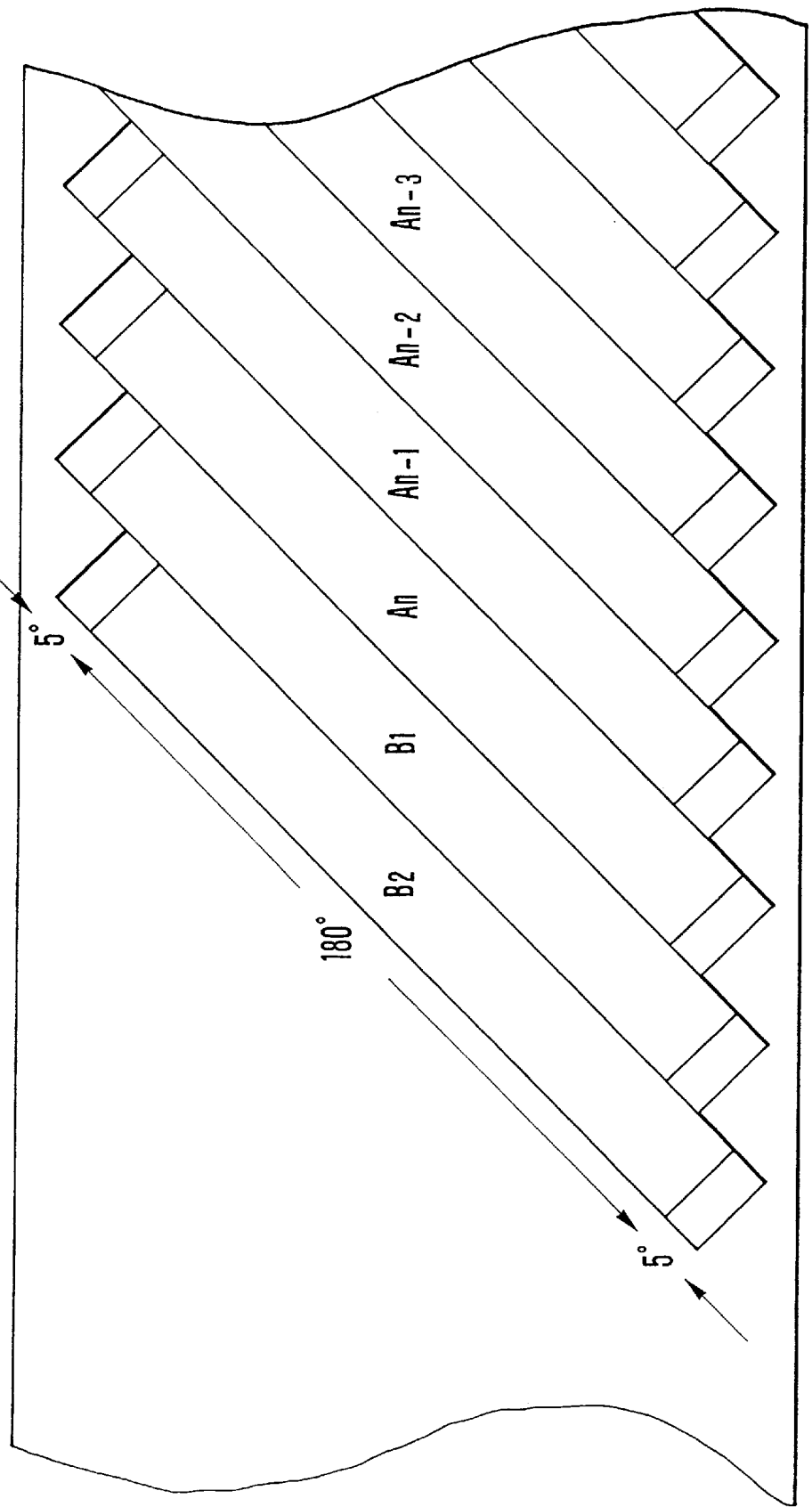
FIG. 3 is a plan view of the track patterns formed by the VTR of FIG. 2.

In the joined shooting operation, the microcomputer 41 gives instructions for controlling the before-described servo loop in such a manner as to form track patterns on the tape, as shown in FIG. 3. When a scene A and another scene B are shot successively in joined relation, video tracks are formed with the last track $A_n$ of the scene A and the first track $B_1$ of the scene B being positioned adjacent to each other. Each track has its end portions which each subtend 5° used to record either of the signals recorded and to be recorded in the preceding and following tracks in overlapping relation.

Here, it is desired that although the pictures vary discontinuously as transition of the scenes occurs, the BGM or like sound does not discontinue between the track $A_n$ and the track $B_1$. The VTR of the present embodiment is to realize the possibility of recording a BGM or like sound does not discontinue at such a transition of one scene to another. For this purpose, the microcomputer 41 is used in controlling the memory.

Figure 4:
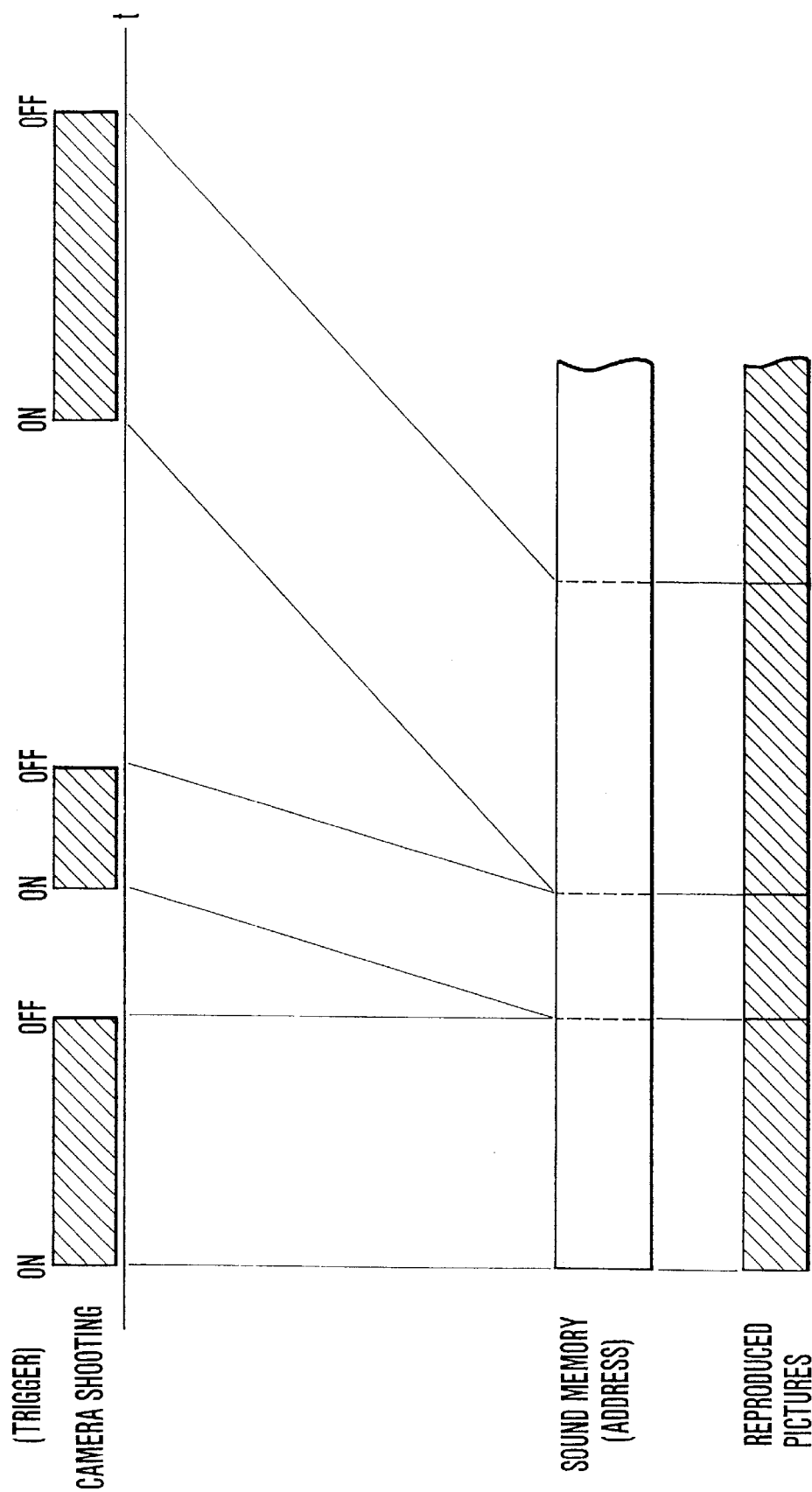
FIG. 4 is a diagram conceptionally illustrating a joined shooting operation of the VTR of FIG. 2.

FIG. 4 is a conceptual view for explaining the idea of memory control of the present embodiment.

On the top line, there is shown a series of discontinuous camera shots as the on-and-off operation of the trigger key 48 is recycled at random. The hatched periods are active in recording with the abscissa representing time.

To cope with this, the memory control circuit 40 operates in such a manner that only when the trigger key 48 is in ON state, the sound memory 39 is read to obtain the audio data. This procedure is shown on a middle line with the addresses of the memory 39 taken in the abscissa.

The bottom line shows a series of continuously reproduced pictures in coincidence with the sound reproduced from the memory 39 with the abscissa representing time.

Figure 5:
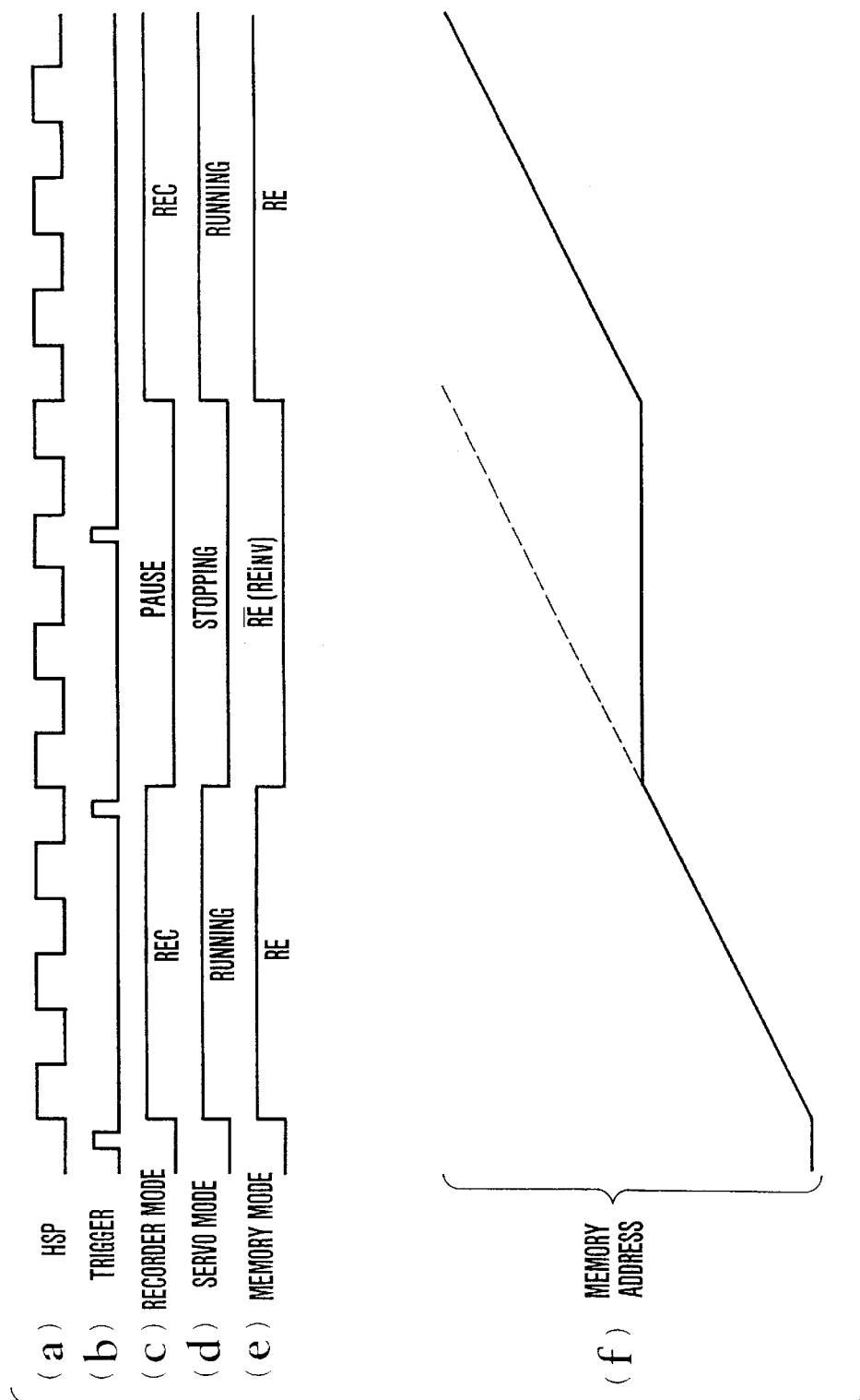
FIG. 5 is a chart illustrating the details of timing concerned with the addresses of the VTR of FIG. 2.

Further, concerning the addresses of the memory, detailed timing is shown in FIG. 5, where (a) is an HSP (head switching pulse) which inverts by every one unit of track formation (one field period). In FIG. 5, (b) is an instruction pulse from the trigger key 48; (c) is a recorder mode control signal which, each time one trigger pulse is received, inverts its level for either of the REC (recording) event and the REC PAUSE (waiting for recording) event in synchronism with inversion of the HSP; (d) is a servo mode control signal which changes the tape over between the running and the stopping events in coincidence with inversion of the recorder mode control signal (c); and (e) is a memory mode control signal which is supplied from the memory control circuit 40 to the memory 39. In response to the signal (e), an RE (Read Enable) mode and an inverse RE or REinv (Read disable) mode are changed over in coincidence with inversion of the servo mode control signal (d), so that only when tracks are formed, the audio signal can be read from the memory 39. In FIG. 5, (f) is an address control signal for the sound memory 39 representing an address which is instructed from the memory control circuit 40 to the memory 39. The upper bits of this address are assigned to a track number, while the lower bits are reset in timing with inversion of the HSP. Incidentally, an inclined dotted line suggests that the reproducing time is shortened by an equal amount to that (corresponding to an arrow mark) for which the tape has been stopped in the recording mode so that the sound is reproduced continuously as is also shown likewise in the conceptual diagram of FIG. 4.

As is apparent from this FIG. 5, only when the tape is running as the video signal from the camera is recorded, the memory 39 operates in the RE mode where memory address numbers are counted up, thereby making it possible to record the BGM or like sound without a discontinuity at the junction of shots. In other words, on the memory addresses, the sound can be read continuously.

Figure 6:
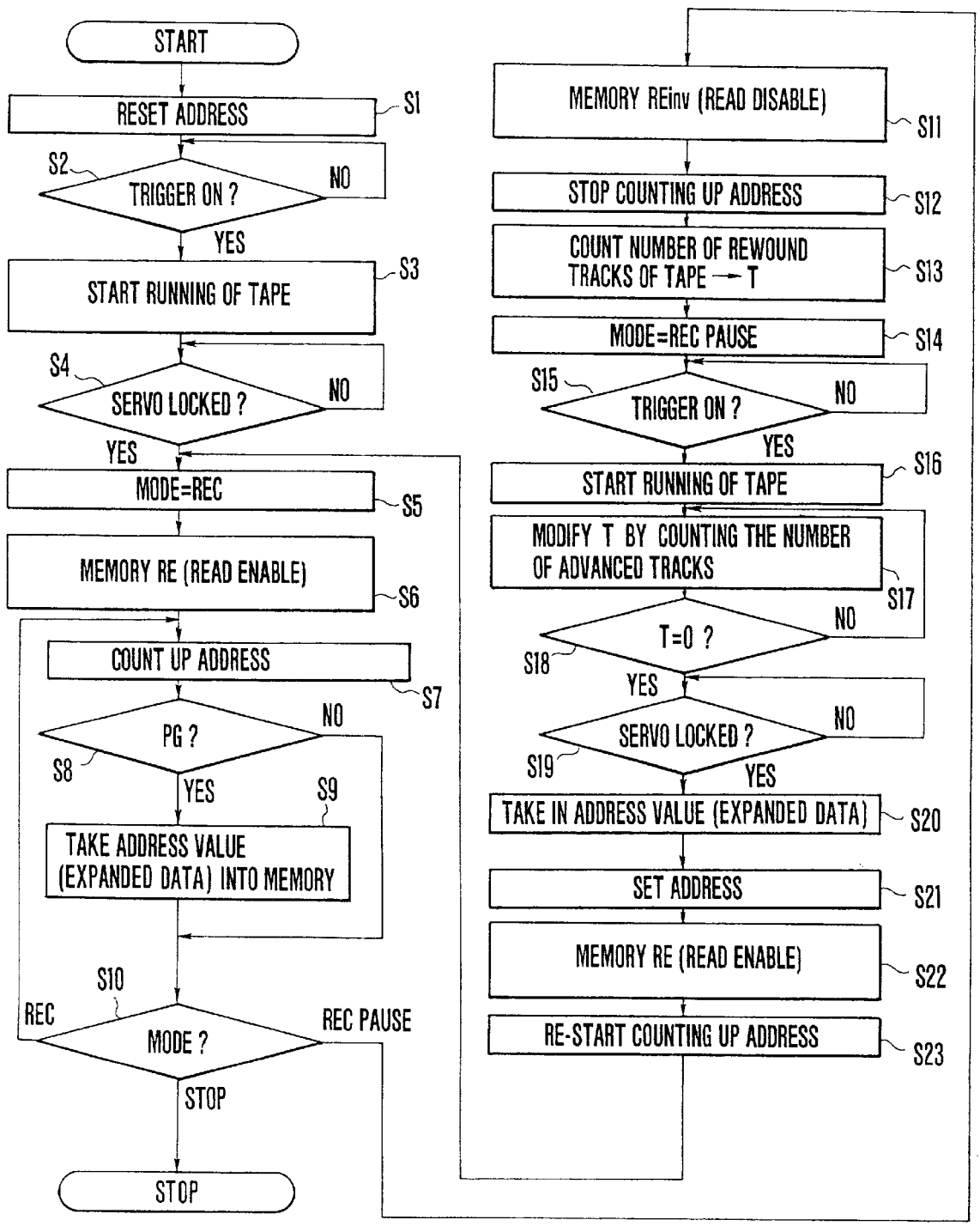
FIG. 6 and FIG. 7 are flowcharts for explaining the operation of the VTR of FIG. 2.

Next, the manner in which the microcomputer 41 operates to effect such joined shooting as described above is described according to the flowchart of FIG. 6.

First, when an electric power source key (not shown) is turned on the operation of the microcomputer 41 according to the flowchart of FIG. 6 begins with its start, commanding the memory control circuit 40 to reset the address of the memory 39 (step S1). And, after this, when the trigger key 48 is turned on (step S2), the microcomputer 41 outputs an instruction for starting the running of the tape to the servo circuit 34 (step S3). After the start of the running of the tape, when the fact that the speed of the tape has locked to a predetermined value is detected by the servo circuit 34 (step S4), the VTR is switched to the recording mode (step S5), and the memory 39 is enabled to read data therefrom (step S6). It is to be noted that this flowchart is on the assumption that the BGM key 46 is in ON state, or the VTR is set in the mode of reading out data from the memory 39.

In this state, as has been described before, the audio signal from the audio signal processing circuit 14, the video signal from the video signal processing circuit 5, and tracking control pilot signals from a pilot signal generating circuit 33 are added together by the adder 6 and recorded on the tape 17. The pilot signal generating circuit 33 responsive to, for example, the HSP outputs four kinds of pilot signals in rotational sequence by each field period. Also, in this state, the microcomputer 41 supplies information representing that recording of the sound from the memory 39 is in progress to a character generating circuit 30. The circuit 30 converts this information into a video signal corresponding to a character recognizable to the visual sense and supplies it to an adder 32. By this, during the time when the sound from the memory 39 is recorded, the aforesaid character is displayed in an electronic viewfinder (EVF) 31 together with the picture being shot.

In this recording state, an address counter within the memory control circuit 40 performs a counting operation (step S7). Also, each time an edge of the PG is supplied (step S8), the address data being counted at present is written in the memory 44 (step S9).

In the recording state, when a stop key (not shown) is turned on in a step S10, the VTR comes into the stop mode, ending the process. Also, when the trigger key 48 is turned on again, transition to the recording pause mode (REC PAUSE mode) occurs, thereby bringing the memory into the read disable mode (step S11) and stopping the address counter from counting (step S12). Thus, reading of the sound information from the memory 39 is stopped.

The servo circuit 34 is then commanded to rewind the tape 17 by a predetermined amount. The amount of the rewound portion of the tape for this time is stored as a number of tracks T (step S13). Here, the VTR is switched to the recording pause mode (step S14), and waits for the trigger key 48 to be turned on again.

When the trigger key 48 is turned on, the VTR is first switched to the reproduction mode where the servo circuit 34 is controlled to start running of the tape again (step S16). As the tape is running, the number of advanced tracks are counted down from the aforesaid number of tracks T to modify the number of rewound tracks T at the present time point. When T=0 results (step S18), and when completion of servo locking is confirmed (step S19), the address data stored in a memory 44 is then taken in (step S20) and this data is set in the address counter within the memory control circuit 40 (step S21). The memory 39 is then switched to the read enable mode again (step S22), and the address counter starts counting again (step S23). Thus, reading of the sound from the memory 39 is started again. At the same time as this re-start, return to the step S5 occurs so the recording mode operates again in the VTR.

If, as such a procedure as has been described above is repeated, the joined shooting operation continues so that the total recording time is equal to or longer than the time of the music stored in the memory, a piece of continuous music can be recorded in superimposed relation on a series of joined shots of pictures.

As is apparent from the foregoing description, according to the video signal recording system of the present embodiment, even in the recording mode for the video signal, a predetermined sound which has been formed in separation can be recorded with ease. Moreover, no novel means are needed in making it possible to record various audio signals.

With the use of the camera-integrated type VTR shown in FIG. 2, in the case of the insert recording, the video signal only is rewritten, leaving the audio signal as it is. For this purpose, an example of arrangement is described below.

In this example, the normal recording mode (first mode) operates in such a manner that the audio signal from the external input terminal 35 or the audio signal from the microphone 8 is recorded on the tape 17 together with a video signal and the selected one of these audio signals for recording is stored in the memory 39. After this, another mode of performing the insert recording (second mode) can follow, where the audio signal stored in the memory 39 is read out and recorded on the tape 17 together with another video signal. Thus, it is possible to rewrite the video signal without causing the audio signal on the tape 17 to change.

Figure 7:
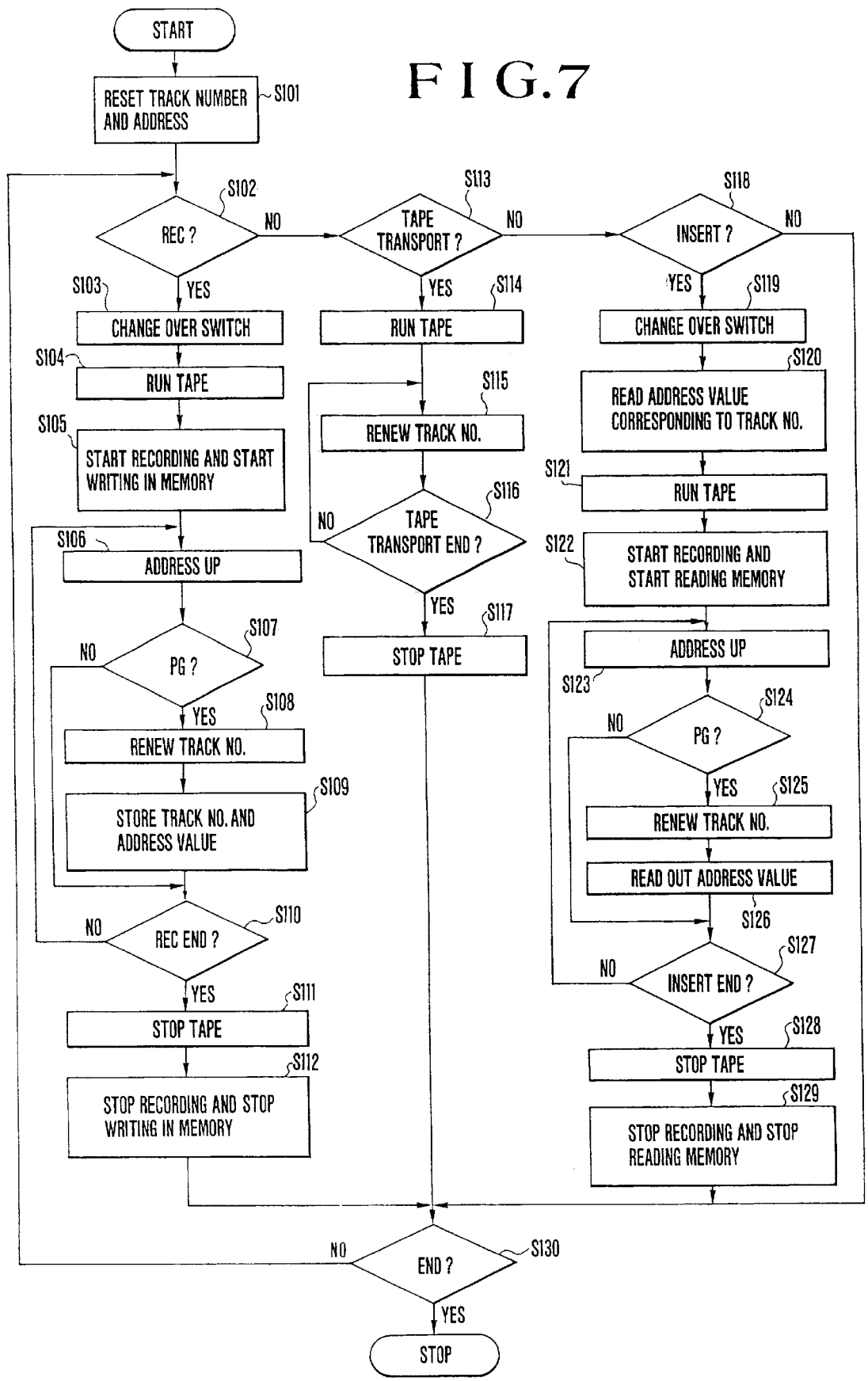

The manners in which the above-described modes of the VTR of FIG. 2 operate are described by reference to the flowchart of FIG. 7 below.

When the electric power source is turned on, or a tape cassette is loaded, the system control microcomputer 41 first resets the internal memories for the track number data and address data (step S101) and waits for instructions from the operation portion 42.

When this waiting terminates by a command for recording (step S102), the balancer 10 is set so that the adder 12 outputs only the audio signal from the microphone 8, and all the switches 4, 13 and 38 are connected to their A sides or B sides (step S103). And, the capstan motor CM is energized to start running of the tape 17 (step S104). The output of the adder 6, or the combined signal of the video signal and the audio signal, is supplied through the switch 15-A or 15-B to the head 16-A or 16-B and starts being recorded on the tape 17. At the same time, the audio signal is written in the memory 39 (step S105).

Thus, the VTR starts to operate the recording mode (first mode). In this recording mode, the process comprises the steps of: counting up address data in the internal memory (S106) to increment the write address of the memory 39 to be supplied to the memory control circuit 40; on generation of every one drum PG (S107), renewing the track number data (S108) and storing the resultant address data in the memory 44 along with the track number data (S109).

As this recording mode is operating, when an end of recording is instructed by the operation portion 42 (step S110), the tape 17 is stopped from further transportation (step S111) and the recording of the signal by the head 16-A and 16-B and the writing in the memory 39 are stopped (step S112). Return to the waiting step then occurs.

Incidentally, the memory 39 is of a capacity large enough to record at least the audio signals for one program.

Now, of the video signal and the audio signal recorded in the recording mode, only the video signal can be rewritten by the insert recording. Prior to making this, the tape 17 has to be rewound to a desired location. In the following, this operation is described. In the state of waiting for operation, when forward or backward running of the tape is commanded (step S113), the capstan motor CM is rotated to either a forward or backward direction, initiating a transportation of the tape 17 (step S114). And, as this tape transportation goes on, the number of capstan FG's varies. In response to this, the track number data stored in the internal memory is renewed (step S115).

As the tape 17 is being transported, when the operation portion 42 gives a tape stop command (step S116), the tape 17 is stopped (step S117) and the microcomputer 41 waits for instructions.

Such a procedure of moving the tape back and forth is repeated a number of times until the tape 17 arrives at a desired position where the insert recording is started. In this state, when the insert recording is commanded by the operation portion 42 (step S118), the balancer 10 is so set that only the output of the D/A converter 45 is selected to be applied to, and output from, the adder 12, and the switch 13 is moved to the B side (step S119). Then, the address data corresponding to the track number data stored in the internal memory of the microcomputer 41 is read out from the memory 44 and is supplied as the read address data to the memory control circuit 40 (step S120). Running of the tape 17 at the normal speed is then started (step S212). Here, recording by the heads 16-A and 16-B is started and reading of the memory 39 is started, beginning with that address which is determined by the read address data (step S122). From this time onward, a newly input video signal and the audio signal stored in the memory 39 are recorded on the tape 17. Since, at this time, the previously recorded audio signal and the audio signal stored in the memory 39 are exactly the same signal, it results that the video signal only is rewritten.

During the insert recording, the read address is incremented (step S123). Each time a drum PG is generated (step S124), the track number data in the internal memory is renewed (step S125). The address data corresponding to that renewed track number data is then read out from the memory 44 (step S126) to preset the read address for the memory 39.

As this insert recording goes on, when an end of the insert recording is commanded by the operation portion 42 (step S127), the tape is stopped (step S128), and the recording by the heads 16-A and 16-B and the reading of the memory 39 is stopped (step S129).

Also, if in the above-described instruction waiting state, the electric power source is turned off, or the cassette is ejected (step S130), the process ends.

In such a way as has been described above, for the tape used in recording, while the audio signal is left at it is, part of the video signal can be rewritten.

As has been described above, according to the features described above, it is made possible that even in a case where a video signal and an audio signal have been recorded in superimposed relation, only the video signal may be later rewritten.

Figure 8:
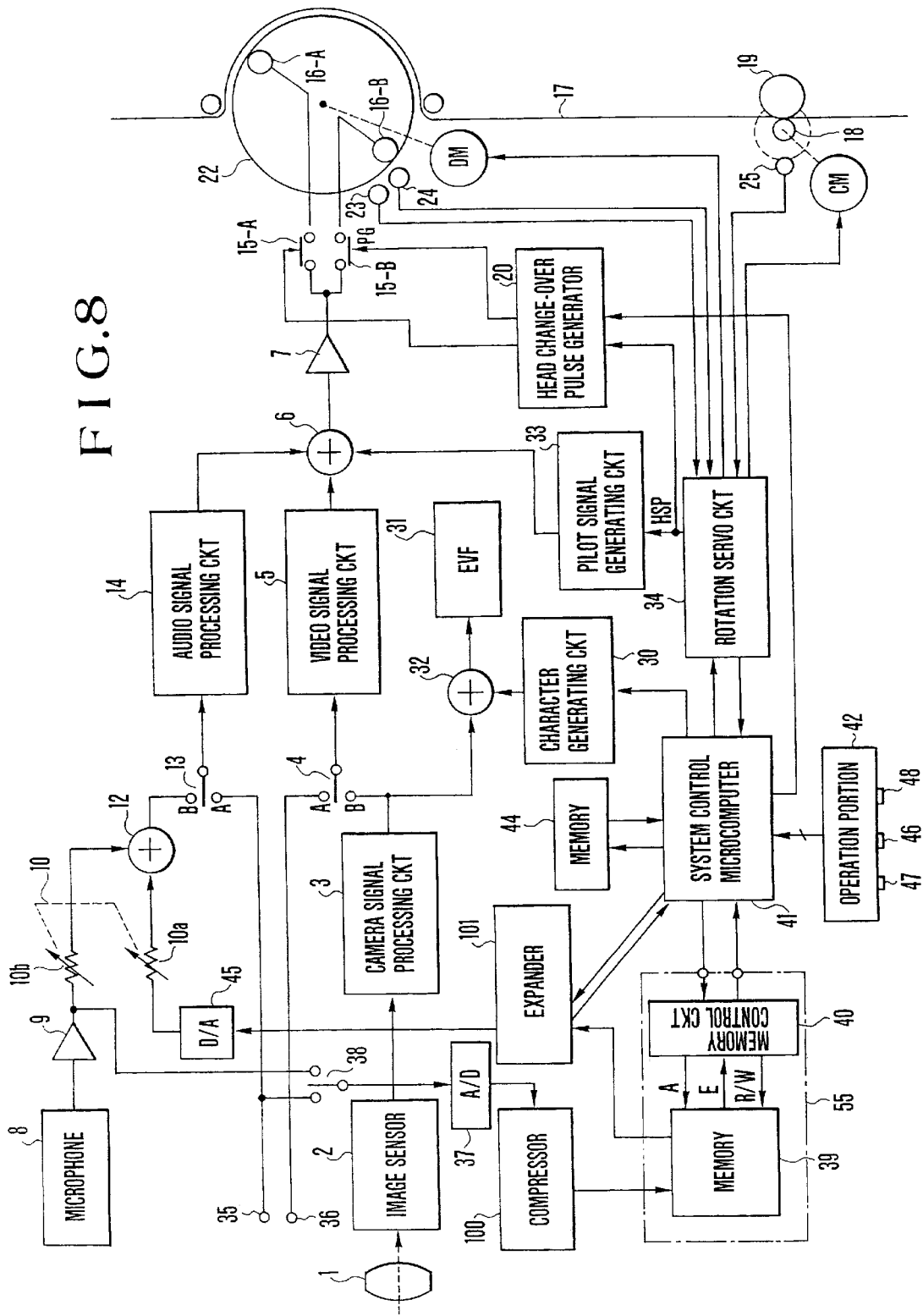
FIG. 8 is a diagram, partly in block form, of the construction of the recording system of another embodiment of the camera-integrated type VTR according to the invention.

FIG. 8 shows the construction of another embodiment of the camera-integrated type VTR according to the invention, where the like parts to those of FIG. 2 are denoted by the same reference numerals and their explanation is omitted.

An information compressor 100 compresses the data digitized by the A/D converter 37 by a known method such as ADPCM and supplies it to the memory 39. At this time, in the ADPCM method, besides the compressed sample data (ADPCM data), it is necessary to output also the not-compressed sample data (hereinafter called the "reset value"). In the present embodiment, the compressor 100 is assumed to output n reset values per a piece of BGM or like sound ahead thereof. Here, the value of this n is determined depending on the used compressing method.

As such reset values and such compressed data are being output from the compressor 38, when the memory key 47 of the operation portion 42 is turned on, the system control microcomputer 41 commands the memory control circuit 40 to bring the memory 39 into a writing state, causing data corresponding to a predetermined period of digital audio signals to be written in the memory 39.

Next, in this example, when recording the sound read out from the memory 39, the compressed audio data read out from the memory 39 is restored to the original audio data by an information expander 101 comprised of an ADPCM demodulator and others. The audio data from the expander 101 is then restored to the analog audio signal by the D/A converter 45.

It should be noted that if the arrangement of FIG. 8 is combined with the above-described flowchart of FIG. 6 when performing the joined shooting, the supply of the compressed data from the memory 39 to the expander 101 is caused to discontinue once. In this example, therefore, the step S9 of FIG. 6 is so modified that when the upper bits of the address data are written in the memory 44, the n expanded data output from the expander 101 are too transferred through the system control microcomputer 41 to and written in the memory 44 (as indicated in FIG. 6 by way of parentheses).

The step S20 also is modified so that when re-starting the reading from the memory 39, the aforesaid n expanded data are taken in the expander 101 along with the upper bits of the address data. In other words, using the n expanded data from the system control microcomputer 41, the expander 101 recovers the audio data by expansion and supplies it to the D/A converter 45.

According to the features of the invention, even when recording video signals, a predetermined sound which has been formed in separation can be recorded easily and its continuity is not lost at all. Also, without having to increase the capacity of the memory means, the separately formed sound of a relatively long time length can be recorded.

What is claimed is:

1. A signal recording system, comprising:
   (a) a recording apparatus including an audio input portion for inputting an audio signal, recording means for recording the audio signal input by said audio input portion and a video signal on a common recording medium and supplying means for converting the audio signal input by said audio input means into a digital signal and outputting the digital audio signal; and
   (b) a memory unit detachably and exchangeably attached to said recording apparatus, said memory unit including a memory for storing the digital audio signal output from said supplying means, wherein said recording apparatus further includes receiving means for receiving the digital audio signal read out from the memory, said recording means recording the audio signal corresponding to the digital audio signal received by said receiving means on the recording medium.

2. A system according to claim 1, wherein said recording apparatus further includes a video input portion, and wherein said recording means records a video signal from said video input portion together with either the audio signal from said audio input portion or the audio signal read out from said memory.

3. A system according to claim 2, wherein said audio input portion includes a microphone, and wherein said video input portion includes a video camera.

4. A system according to claim 2, wherein said memory unit is able to write the audio signal from said audio input portion in said memory while the audio signal from said audio input portion and the video signal from said video input portion are recorded by said recording means.

5. A system according to claim 4, wherein said recording means is arranged to record signals while forming a multiplicity of parallel tracks on said recording medium, and wherein said system further comprises address control means for controlling an address of said memory in units of one track.

6. A system according to claim 1, wherein said recording means is able to selectively record one of the audio signal from said audio input portion and the audio signal read out from said memory.

7. A system according to claim 1, wherein said recording means is able to record a composite audio signal obtained by combining the audio signal from said audio input portion and the audio signal read out from said memory.

8. A signal processing apparatus to which a memory unit is detachably attached, said apparatus comprising:
   audio input means for inputting an audio signal;
   recording means for recording the audio signal input by said audio input means and a video signal on a common recording medium;
   supplying means for converting the audio signal input by said audio input means into a digital signal and outputting the digital audio signal to the memory unit, the memory unit storing the digital audio signal output from said supplying means; and
   receiving means for reading out the digital audio signal from the memory unit, said recording means recording the audio signal corresponding to the digital audio signal received by said receiving means on the recording medium.

9. An apparatus according to claim 8, wherein the recording medium is detachably attached to the recording apparatus.

10. An apparatus according to claim 9, wherein the recording medium includes a tape-shaped recording medium.

11. An apparatus according to claim 10, wherein said recording means includes a rotary head for recording the audio signal and the video signal on the tape-shaped recording medium.

12. An apparatus according to claim 8, wherein the memory unit includes an IC card.

13. An apparatus according to claim 8, wherein said supplying means includes compressing means for compressing an information amount of the digital audio signal.

14. An apparatus according to claim 13, wherein said receiving means includes expanding means for expanding the information amount of the digital audio signal read out from the memory unit.

15. An apparatus according to claim 8, further comprising control means for controlling a recording operation of said recording means and a reading operation of said receiving means cooperatively.

16. An apparatus according to claim 8, further comprising video input means for inputting the video signal and display means for displaying an image corresponding to the video signal input by said video input means.

17. An apparatus according to claim 16, wherein said display means displays a predetermined information when the digital audio signal output from said supplying means is written into the memory unit.

* * * * *

UNITED STATES PATENT AND TRADEMARK OFFICE
CERTIFICATE OF CORRECTION

PATENT NO. : 6,091,885
DATED : July 18, 2000
INVENTOR(S) : Koji Takahashi et al.

It is certified that error appears in the above-identified patent and that said Letters Patent is hereby corrected as shown below:

<u>Column 4,</u>
Lines 52 and 55, delete "signal" and insert -- signals --.

Signed and Sealed this

First Day of January, 2002

Attest:

JAMES E. ROGAN
*Attesting Officer*     *Director of the United States Patent and Trademark Office*